United States Patent
Schantz et al.

(10) Patent No.: US 7,343,881 B2
(45) Date of Patent: Mar. 18, 2008

(54) ANIMAL HARNESS

(75) Inventors: Brad L. Schantz, Evanston, IL (US); Donald E. Godshaw, Evanston, IL (US); Du Hai, Mt. Prospect, IL (US)

(73) Assignee: Travel Caddy, Inc., Elk Grove Village, IL (US)

( * ) Notice: Subject to any disclaimer, the term of this patent is extended or adjusted under 35 U.S.C. 154(b) by 0 days.

(21) Appl. No.: 11/473,431

(22) Filed: Jun. 23, 2006

(65) Prior Publication Data
US 2006/0288959 A1 Dec. 28, 2006

Related U.S. Application Data

(63) Continuation-in-part of application No. 11/288,553, filed on Nov. 29, 2005, now abandoned.

(60) Provisional application No. 60/693,951, filed on Jun. 24, 2005.

(51) Int. Cl.
*A01K 27/00* (2006.01)
(52) U.S. Cl. .................. 119/792; 119/771; 119/856
(58) Field of Classification Search ................ 119/856, 119/857, 792, 771, 769, 850, 907, 770; 54/79.1, 54/79.2; D30/145
See application file for complete search history.

(56) References Cited

U.S. PATENT DOCUMENTS

| | | | |
|---|---|---|---|
| 5,794,571 A | 8/1998 | Goldberg | |
| 5,913,285 A | 6/1999 | Pritchard | |
| 5,915,335 A | 6/1999 | Holt, Jr. | |
| 5,950,570 A * | 9/1999 | Dickerson | 119/792 |
| 6,101,979 A | 8/2000 | Wilson et al. | |
| 6,123,049 A * | 9/2000 | Slater | 119/850 |
| 6,637,377 B2 * | 10/2003 | Lobanoff et al. | 119/792 |
| 6,827,044 B2 * | 12/2004 | Lobanoff et al. | 119/771 |

FOREIGN PATENT DOCUMENTS

JP 2002-65097 * 3/2002

OTHER PUBLICATIONS

Pet Tails—Dog Walking Harness.
Morrco Pet Supply—Kwik Klip Adjustable Dog Harness.
Morrco Pet Supply—2-Paws-In padded Dog Harness.
Morrco Pet Supply—Colored Leather Dog Harness.
Champion—K-9 Life Vest.
Champion Canine Designs—Comfort Ride Pet Seat.
Champion Canine Designs—Champion Canine Truck Restraint.
LDS Leather Company—Original Tracking Harness.
LDS Leather Company—Custom Leather Dog Walking Harness.

(Continued)

*Primary Examiner*—T. Nguyen
(74) *Attorney, Agent, or Firm*—Banner & Witcoff, Ltd.

(57) ABSTRACT

An animal harness includes a chest and girth panel with a front side, a rear-end or tail side, an abdominal or girth strap section connecting the sides to form left and right side leg openings. Lateral side straps extend from the front of the chest panel to the tail of the harness where they may be joined to together and attached to a seat belt. Adjustable buckle straps are provided to connect the top of the lateral sides of the harness to retain the harness fitted on an animal.

12 Claims, 15 Drawing Sheets

OTHER PUBLICATIONS

LDS Leather Company—The Combination Assistance Dog Harness.
LDS Leather Company—Support Assistance Mobility Dog Harness with Ergonomic Adjustable Pivoting Handle.
LDS Leather Company—American Style Guide Dog Harness.
LDS Leather Company—British Style Guide Dog Harness.
ForDogTrainers—Agitation/Protection Attack Leather Dog Harness.
ForDogTrainers—Exclusive Luxury Handcrafted Padded Leather Dog Harness.
ForDogTrainers—Nylon Dog Harness for Tracking/Pulling.
Drs. Foster & Smith, Inc.—Economy Car Safety Harness and Fleece-Lined Car Safety Harness.
Drs. Foster & Smith, Inc.—GoAnywhere Car Harness.
Champion Canine Designs—Champion Canine Seat Belt System.
Paw Luxuries, Paw Luxuries Features, BMW Makes Your Pet Secure.
http://www.altrec.com, Aug. 3, 2006, Ruff Wear: Web Master Dog Harness.
http://www.autosportcatalog.com/index, Aug. 3, 2006, Auto Pet Safety Harness.
http://thecyberdogusa.com, Aug. 3, 2006, Spiked Dog Harness.
http://natureofthepet.stores, Aug. 3, 2006, XS Doggie Design Pink Netted Dog Harness.
http://www.goodhumans.com, Aug. 3, 2006, Small Dog Harness from Earthdog.
http://www.dogclothes-apparel.com, Aug. 3, 2006, Paw Print Parade Dog Lead and Two-Step Harness.
http://www.dog.com, Aug. 3, 2006, Sporn No-Pull Dog Harness.
http://entirelypets.stores, Aug. 3, 2006, The Surefit(R) Harness.
http://www.longhornplanet.com, Aug. 3, 2006, Texas Longhorns Burnt Orange Dog Harness.
http://www.just4pooches.com, Aug. 3, 2006, Hunter(R) Official NY Yankees Collars & Leads.
http://www.collarshop.com, Aug. 3, 2006, Diva Leather Dog Harness with Rhinestone.
http://www.collarshop.com, Aug. 3, 2006, Pink Plaid Leather Harness; Zita Leather Harness; Step & Go Adjustable Leather Dog Harness; Soft Suede Leather Puppy Harness.
http://www.drsfostersmith.com, Aug. 3, 2006, Quick-Klip Adjustable Nylon Harness.
http://www.drsfostersmith.com, Aug. 3, 2006, Gentle Leader(R) Easy Walk Harness.
http://www.orvis,com, Aug. 3, 2006, Gentle Collar Harness.
http://www.target.com, Aug. 3, 2006, Canine Vehicle Safety Harness.
http://www.sears.com, Aug. 3, 2006, Medium Harness.
Linnet International Co., Ltd., Safety Car Belt For Dog.
http://www.celebritypetwear.com, Aug. 3, 2006, Backpack Dog Harness.
http://orionsmommadethese.stores, Aug. 3, 2006, Guardian Gear Dog Safety Harnesses.

* cited by examiner

ANIMAL HARNESS

CROSS-REFERENCE TO RELATED APPLICATION

This is a continuation in part utility application derived from and based upon application Ser. No. 11/288,553 filed Nov. 29, 2005 now abandoned entitled "Animal Harness" and provisional application Ser. No. 60/693,951 filed Jun. 24, 2005, each of which is incorporated herewith by reference and for which priority is claimed.

BACKGROUND OF THE INVENTION

In a principal aspect the present invention relates to an animal harness and, more particularly, to a harness that may be used for four-legged animals, particularly canine and feline animals. The harness is especially useful for vehicular travel inasmuch as it may be attached to a seat belt thereby providing a safety restraint for the animal wearing the harness.

Pets, particularly cats and dogs, often travel as a companion with their owners. During such travel the pet may be placed on a seat in a vehicle, for example the front seat on the passenger side adjacent to the driver. In the event of an accident or collision of the vehicle in which an animal is so situated, the animal is exposed to potential severe trauma. Of course, airbags may be available to reduce the impact or trauma. Nonetheless, various means for using a seat belt in order to restrain an animal have been suggested to enhance the safety of the animal. Prior art patents illustrating safety harnesses for animals include the following:

| Title | Patent No. | Issue Date |
|---|---|---|
| VEHICULAR SAFETY RESTRAINTS FOR PETS | 5,794,571 | Aug. 18, 1998 |
| NON-CHOKING PET RESTRAINT | 5,913,285 | Jun. 22, 1999 |
| DOG CAR RESTRAINT | 5,915,335 | Jun. 29, 1999 |
| ADJUSTABLE SAFETY PET HARNESS | 6,101,979 | Aug. 15, 2000 |

While such prior art harnesses or restraint systems may have merit, nonetheless an improved harness design which will provide enhanced protection for an animal is considered desirable. It is with this background that the present invention was conceived.

SUMMARY OF THE INVENTION

Briefly, the present invention comprises an animal harness incorporating a multiple number of interrelated and connected component parts. The harness includes a chest panel which may be fitted over the chest and extends under the girth, or abdomen, of the animal. The chest panel is generally symmetrical about a longitudinal axis extending from the head end toward the tail end of the panel. A left-side opening and a right-side opening on opposite sides of the longitudinal axis of the panel are provided for the front legs of the animal. The panel thus includes a front or forward end and a tail or rear end with first and second longitudinal sides extending between the ends. The girth section connects the opposite sides of the panel and, in combination with the chest or front portion of the panel, forms the openings for the right and left front legs of the animal. The harness further includes at least one connection strap that may be fitted over the back of the animal for connecting the upper margins or sides of the panel to thereby provide a head opening. A reinforcing strap assembly extends longitudinally from the opening for the head or the head end of the chest panel to the tail end. The strap assembly comprises a left-hand strap and a right-hand strap located respectfully on opposite sides of the chest and girth panel, each strap extending generally parallel to the longitudinal axis between the front end and the tail end of the panel. The first and second straps are connectable at the tail end of the harness and in one embodiment are also joined together at the front chest section of the panel. The connected side straps cooperate with a connection link or strap at the tail end which, in turn, may be connected to a substantially stationary position element such as a seat belt or stanchion.

In a preferred embodiment the tail ends of the left and right side straps each include a D-ring that cooperates with the single connection strap. The left and right or first and second longitudinal side straps are preferably positioned to extend along the lateral sides of an animal retained within the harness. Thus, in the event of a sudden stop, for example, the first and second lateral side straps will tend to cradle the animal in combination with the chest and girth panel and thereby spread the load and shock which will be imparted to the animal.

As a further preferred feature of the invention, the ends of the left and right side straps may each be folded upon themselves and retained in a retainer element so that the harness may be placed upon an animal and the side straps folded so as to not interfere with animal movement.

In a preferred embodiment, more than a single joinder strap is utilized to attach the left and right hand longitudinal sides of the chest and girth panel. The joinder straps include releasable and adjustable buckles so that the animal may be positioned within the harness in a manner where the legs will easily fit through the openings in the chest panel and the harness will be snugly fitted on the animal. Additionally, the forward or front chest section of the panel may include one or more reinforcement straps including a vertical strap joined to the lateral side straps. Also stiffener material or extensions may be incorporated at the tail end of the harness or panel for the animal.

Thus, it is an object of the invention to provide an improved animal harness.

It is a further object of the invention to provide an animal harness which may be easily placed upon an animal such as a dog or cat.

Another object of the invention is to provide an animal harness having a chest panel with right-hand and left-hand lateral straps along the sides of the chest panel connectable to a restraining element such as a seat belt.

Another object of the invention is to provide an animal harness which provides for protective restraints on the lateral sides of the animal and on the forward or chest section of the animal.

A further object of the invention is to provide an animal harness which may be placed upon an animal by means of adjustable straps and buckles so that the harness may be used for animals of various sizes and shapes.

Another object of the invention is to provide an animal harness which is rugged, easy to use, inexpensive and durable.

These and other objects, advantages and features of the invention will be set forth in a detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
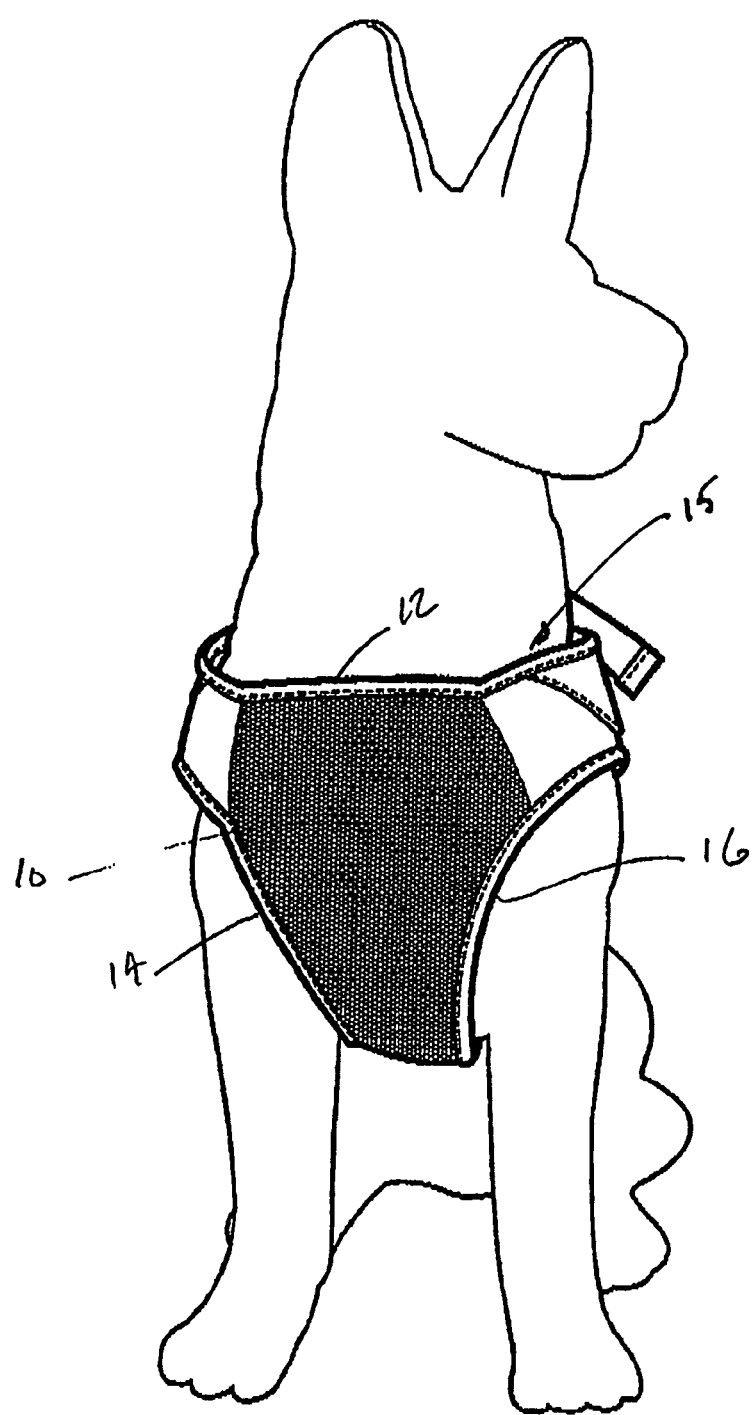
FIG. 1 is a front view of the animal harness of the invention positioned on a canine.
Figure 2:
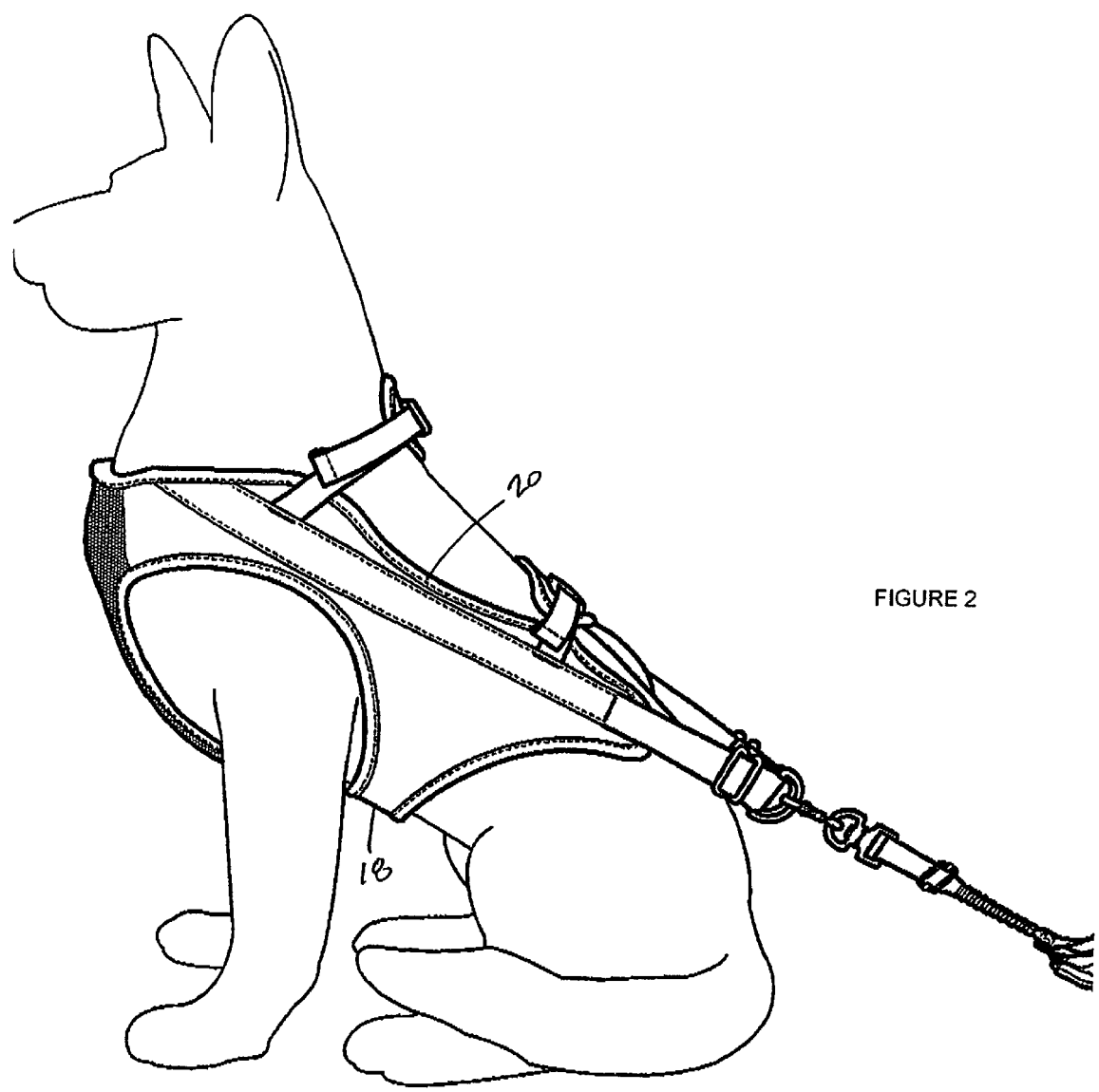
FIG. 2 is a left hand side view of the animal harness as depicted in FIG. 1.

Referring to the figures, the animal harness of the invention is particularly useful for animals such as those from the canine and feline species. However, it is not so limited and may be used with any specie of four-legged animal for protecting the animal by employing the harness in a manner which will restrain the animal and maintain the animal in a generally safe position when being transported in a vehicle, for example. That is, the animal harness of the invention can be attached to a fixed position element, such as a seat belt buckle or a stanchion, so that in the event the vehicle makes an unplanned, quick stop or other perturbation to its movement, the animal will be protected from undesirable movement and thereby, for example, prevented from being thrown into a dashboard or against a sidewall of a vehicle bed or the like. Additionally, in contrast to utilization of a neck leash, the animal harness of the invention does not expose the animal to the likelihood of a neck injury since the harness of the invention fits over and protects the full body, including the torso, of the animal.

Thus, referring to the figures, the animal harness in the form or embodiment of a dog harness, comprises a chest and girth panel 10. The chest and girth panel 10 is typically formed from a durable fabric material and may include internal or surface padding. The chest and girth panel 10 includes an upper front margin or edge 12, a right hand leg opening 14 and a left hand leg opening 16. The panel 10 extends downwardly along and under the chest of the animal and includes an underside cross member or girth panel section or strap 18 which fits generally against the abdomen of the animal and extends upwardly along the lateral sides or rib section of the animal where it is connected to upper side sections 21, 23 and margins including an upper left hand margin 20 and upper right hand margin 22. First and second adjustable length generally parallel straps 24 and 26 include connection buckles 28 and 30, respectively, and interconnect the left and right hand margins 20, 22. An upper or forward strap 24 fits over the top of the neck of the animal. A lower or mid-body strap 26 attaches the girth or abdominal section of the panel 10. The harness includes a generally longitudinal axis 32 extending from the head to the tail and about which the harness is generally symmetrical.

Figure 3:
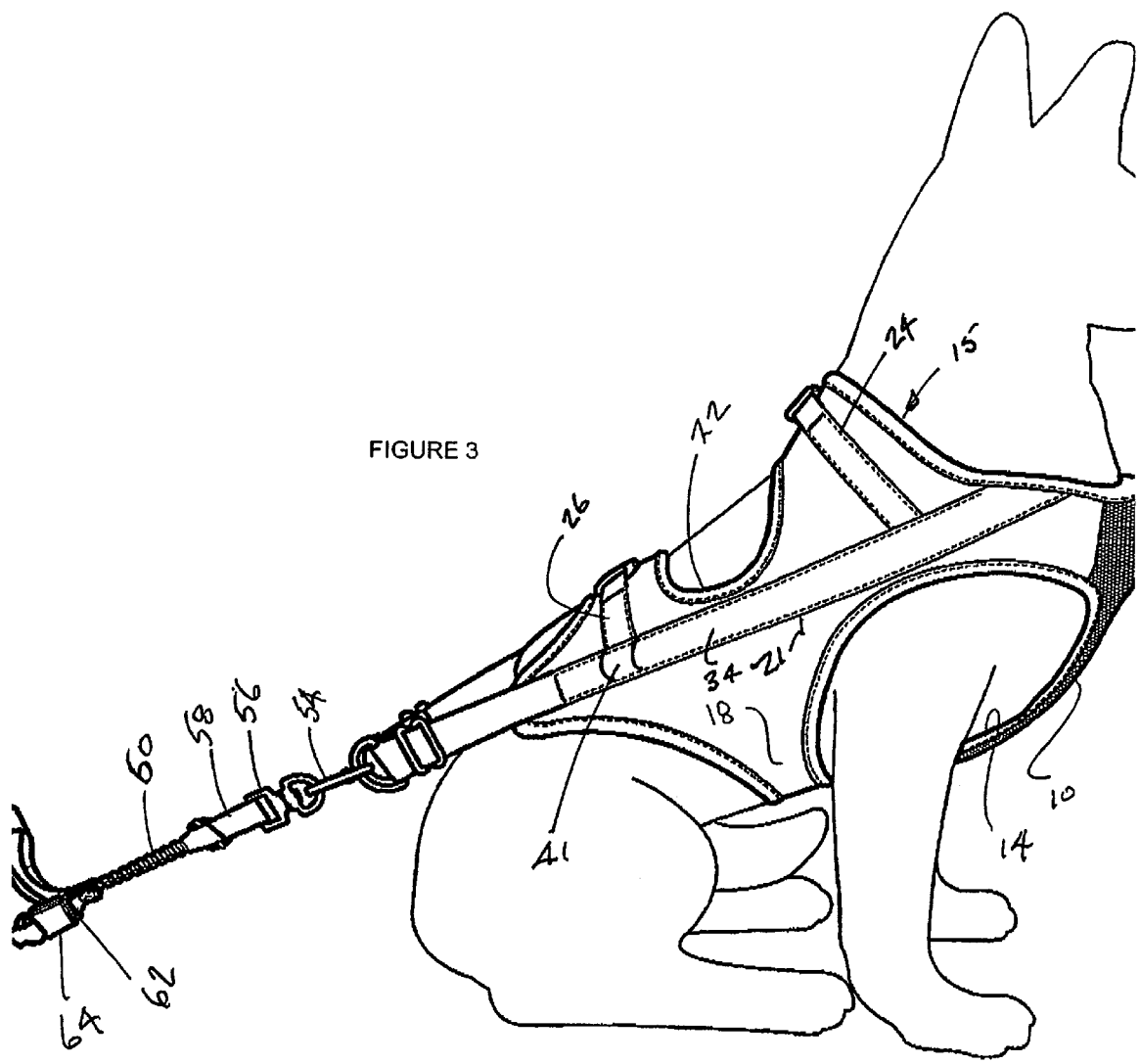
FIG. 3 is a right hand side view of the animal harness of FIG. 1.
Figure 4:
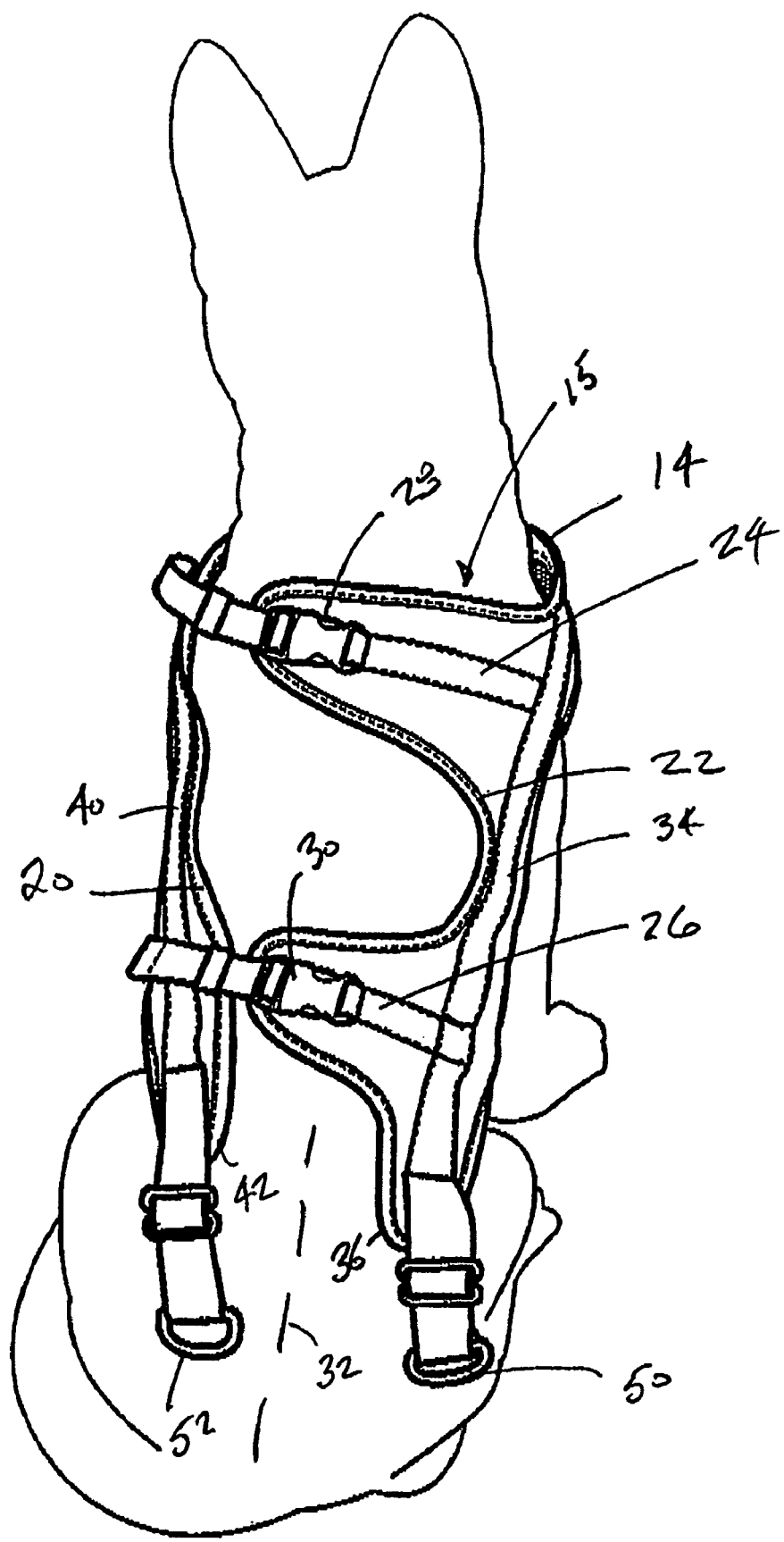
FIG. 4 is a top view of the animal harness of FIG. 1.
Figure 5:
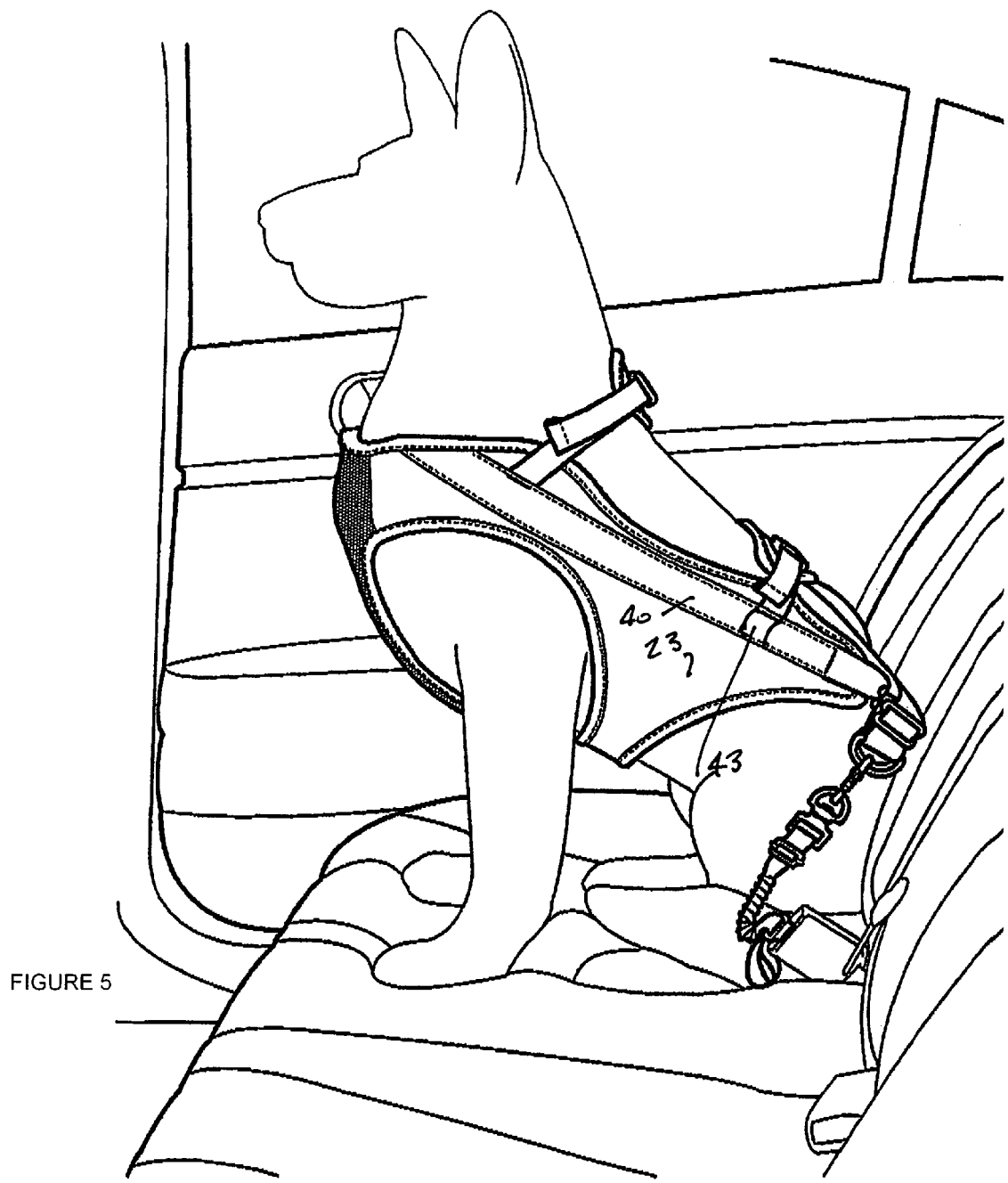
FIG. 5 is an isometric view of the animal harness of FIG. 1 on a canine positioned within a motor vehicle with the harness attached to a seat buckle.
Figure 6:
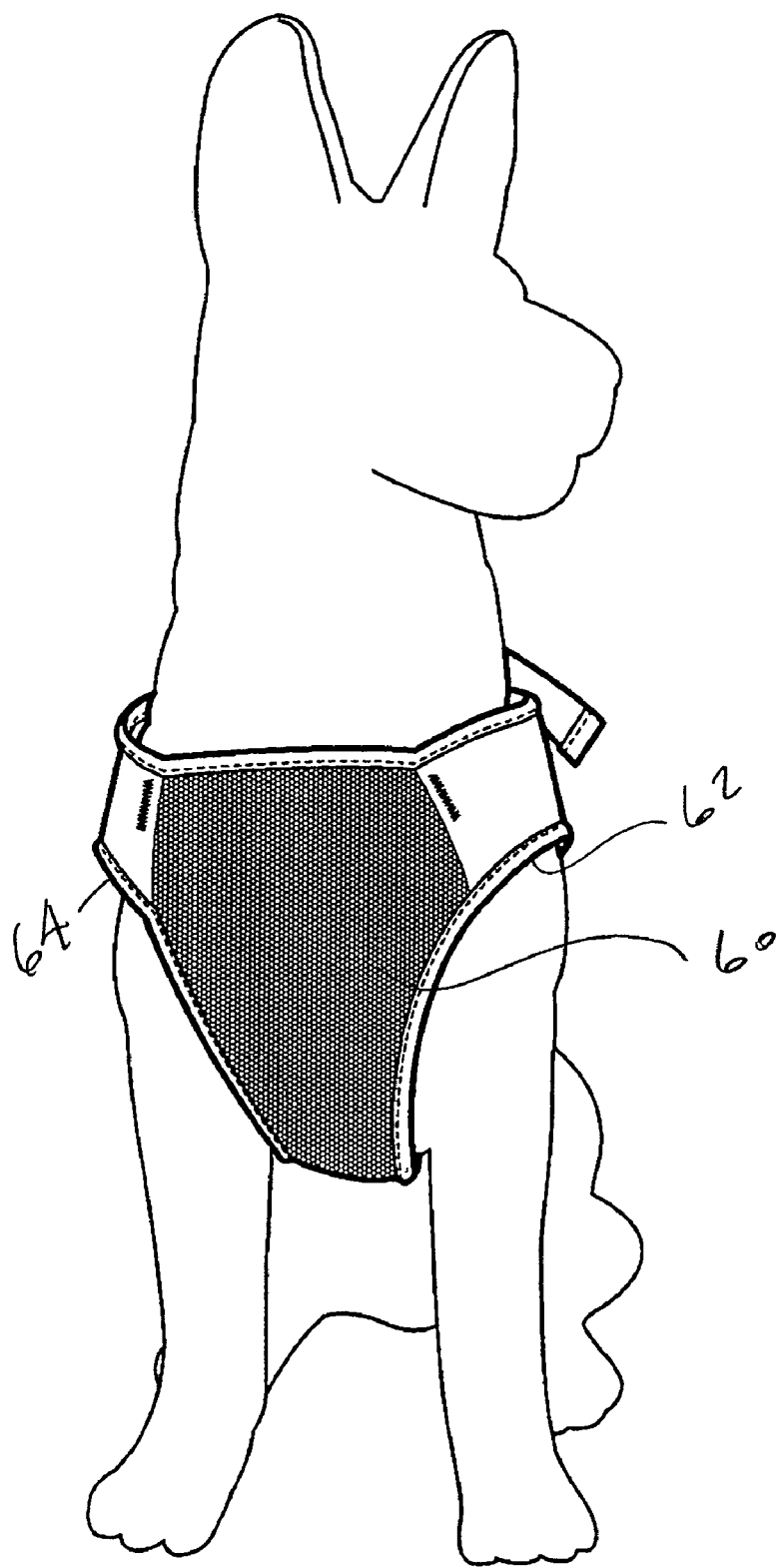
FIG. 6 is a front elevation of an alternative embodiment of the invention illustrating additional features.

A right hand reinforcing strap 34 is stitched or attached to the right side section 21 of the panel and extends from the neck opening 14 to the tail end 36 of the harness. A left hand reinforcing strap 40 is stitched to left side section 23 and extends in similar fashion from the head or neck opening 15 to the tail end 42. The straps 34 and 40 include end D-buckles 50 and 52 which may be connected together by a carbineer 54 that, in turn, is connected to a swivel buckle 56. The swivel buckle 56 is attached to an adjustable strap 58 that may be attached to an elastic or bungee cord connector 60. The bungee connector 60 attaches to a further buckle element 62 which may be latched to a seat belt buckle 64 so that the harness may be attached to a vehicle seatbelt buckle 64 as depicted, for example, in FIGS. 3 and 5.

Right side D loop or buckle 50 may be fitted through an elastic strap 41 for storage when the ends of strap 34 are not being employed for restraint of the animal. Similarly, an elastic retainer strap 43 cooperates with the free end of strap 40 to hold buckle 52 safely.

The right side section 21 includes projective extensions 70 and 72 associated with straps 24 and 26 projecting transverse to axis 32. These extensions are padded preferably to enhance comfort and protection of the animal in the harness.

In use, the harness is first placed about the body, in particular, the front and lower torso of the animal with the chest and girth panel 10 being placed against the chest and abdomen of the animal and the straps 24 and 26 then being attached one to the other as the legs of the animal are placed through the leg openings 14 and 16. The lateral or side straps 34 and 40 may then be attached to a seatbelt buckle as, for example, depicted in FIG. 5 so that the animal may be safely retained, for example, in a car seat.

Various size versions of the harness may be utilized, depending upon the size of the animal involved. The animal harness may also be attached to a fixed stanchion or other connection element on the bed of a truck or other type of vehicle or in an animal cage, for example.

The harness is adjustable and in the event of a sudden stop, the optional bungee cord connection 60 will dampen sudden movement of the animal in a controlled and safe manner.

Thus, if the animal is in the front seat of a motor vehicle, for example, where an air bag will provide little, if any, protection, the harness of the invention will provide significant safety advantages for the animal. In addition, the safety harness may be used in combination with a leash when the animal is being walked. For example, a leash may be attached via the carbineer 54 for movement of the dog or animal outside of a vehicle.

FIGS. 6-15 illustrate an additional embodiment of the invention incorporating further features which are incorporated to enhance the durability of the animal harness and to maintain the animal wearing the harness in a safe, yet comfortable manner. Thus, the embodiment of FIGS. 6-15 incorporates a series of additional features which can be generally characterized as follows. First, the lateral side strap assembly which was described as the side or lateral straps 34 and 40 in the embodiment of FIGS. 1-5 is formed as a continuous strap that extends on opposite sides of the animal from the tail end of the harness across the front section or chest panel. The strap is folded in a manner which facilitates support and reinforcement of the front or chest panel. Second, as a further feature, additional reinforcing straps, and in particular a vertical reinforcing strap, are positioned and incorporated in the front or chest panel. Third, various stiffening materials or elements are added on the left and right hand sides of the animal harness and, in particular, toward the tail section as well as forming potentially, at least in part, the front portion of the chest panel. Fourth, the bungee cord is typically eliminated in the embodiment of FIGS. 6-15 and thereby the elastic movement of the connection between the harness and a retention element such as a seatbelt is eliminated. Following is a more detailed discussion of these additional features.

Figure 7:
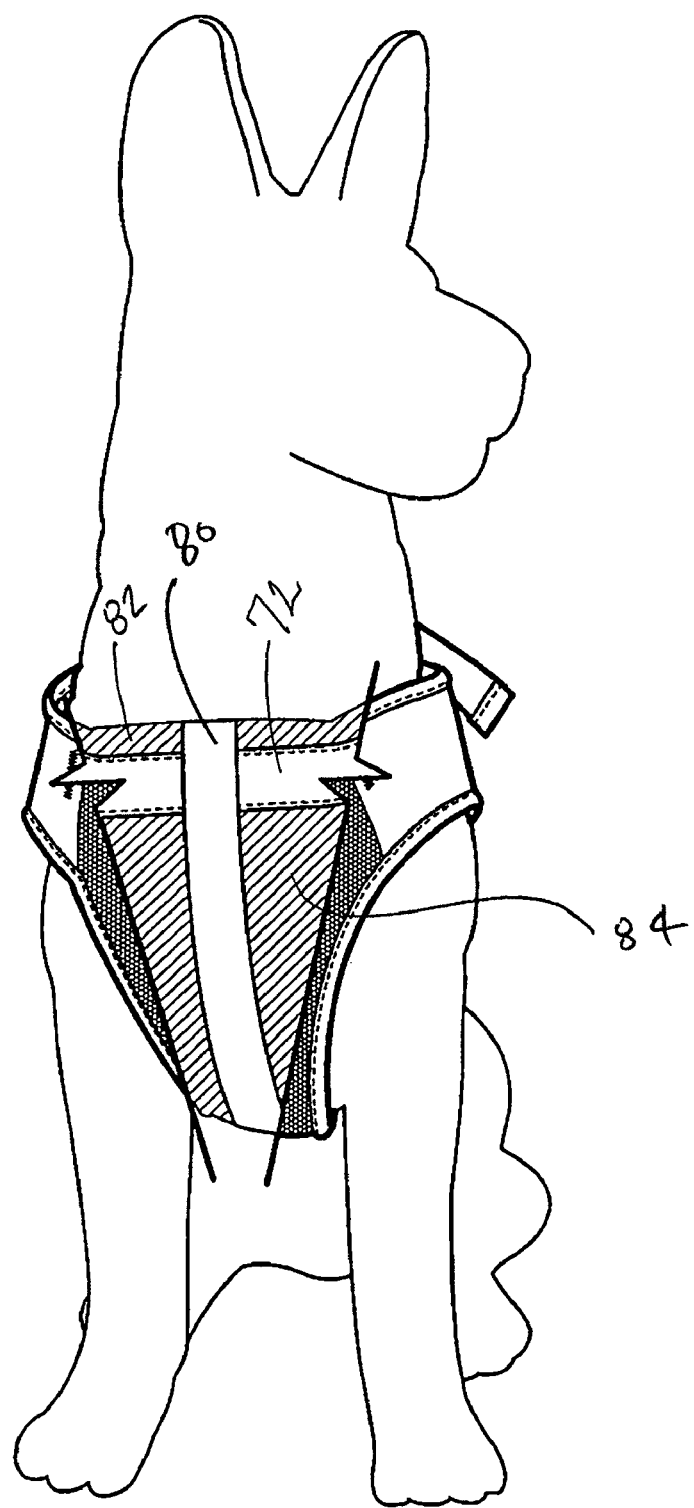
FIG. 7 is a front elevation of the embodiment of FIG. 6 wherein the animal harness is depicted in a partially cut away view.
Figure 8:
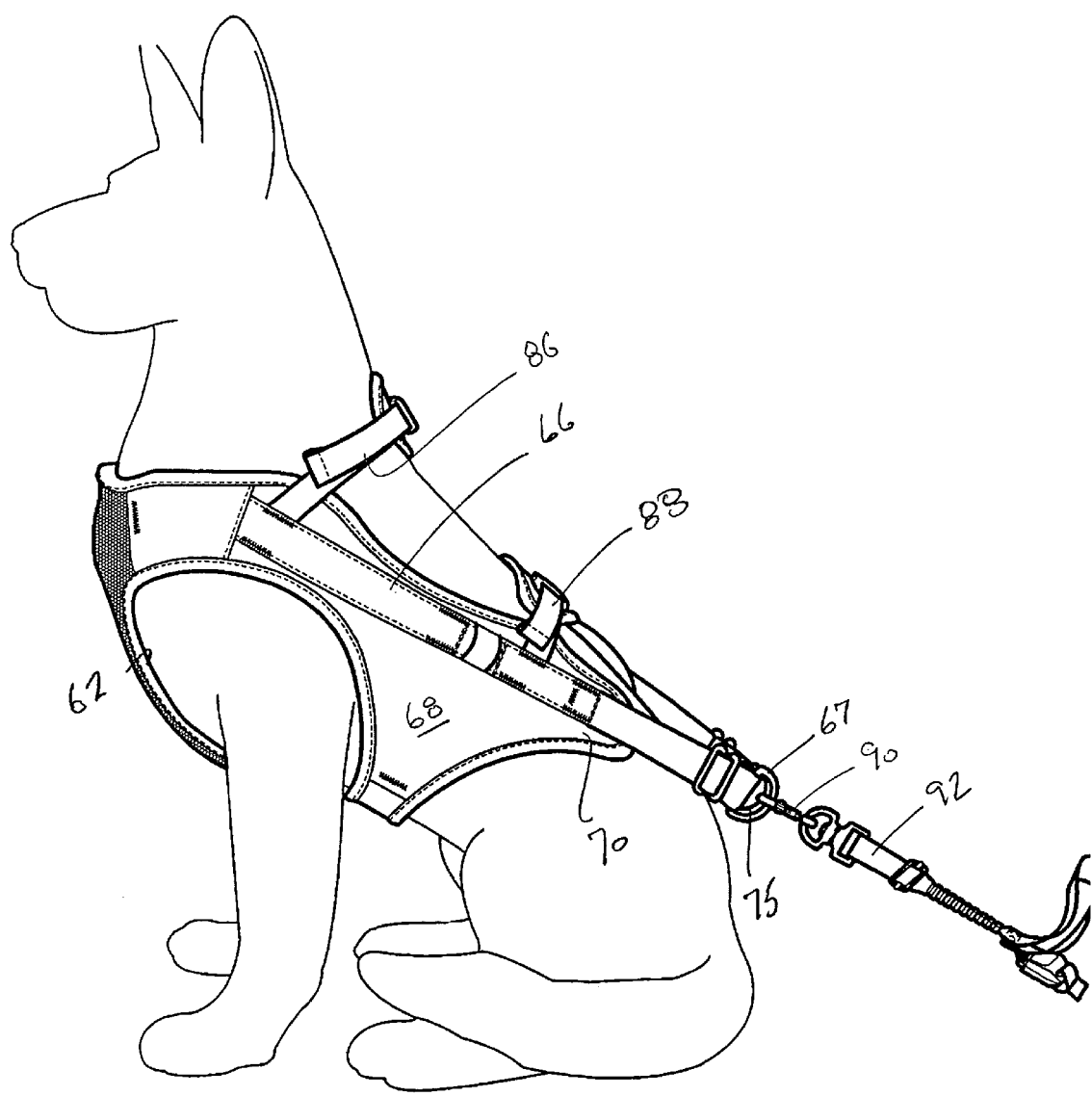
FIG. 8 is a left side elevation of the embodiment of FIG. 6.
Figure 9:
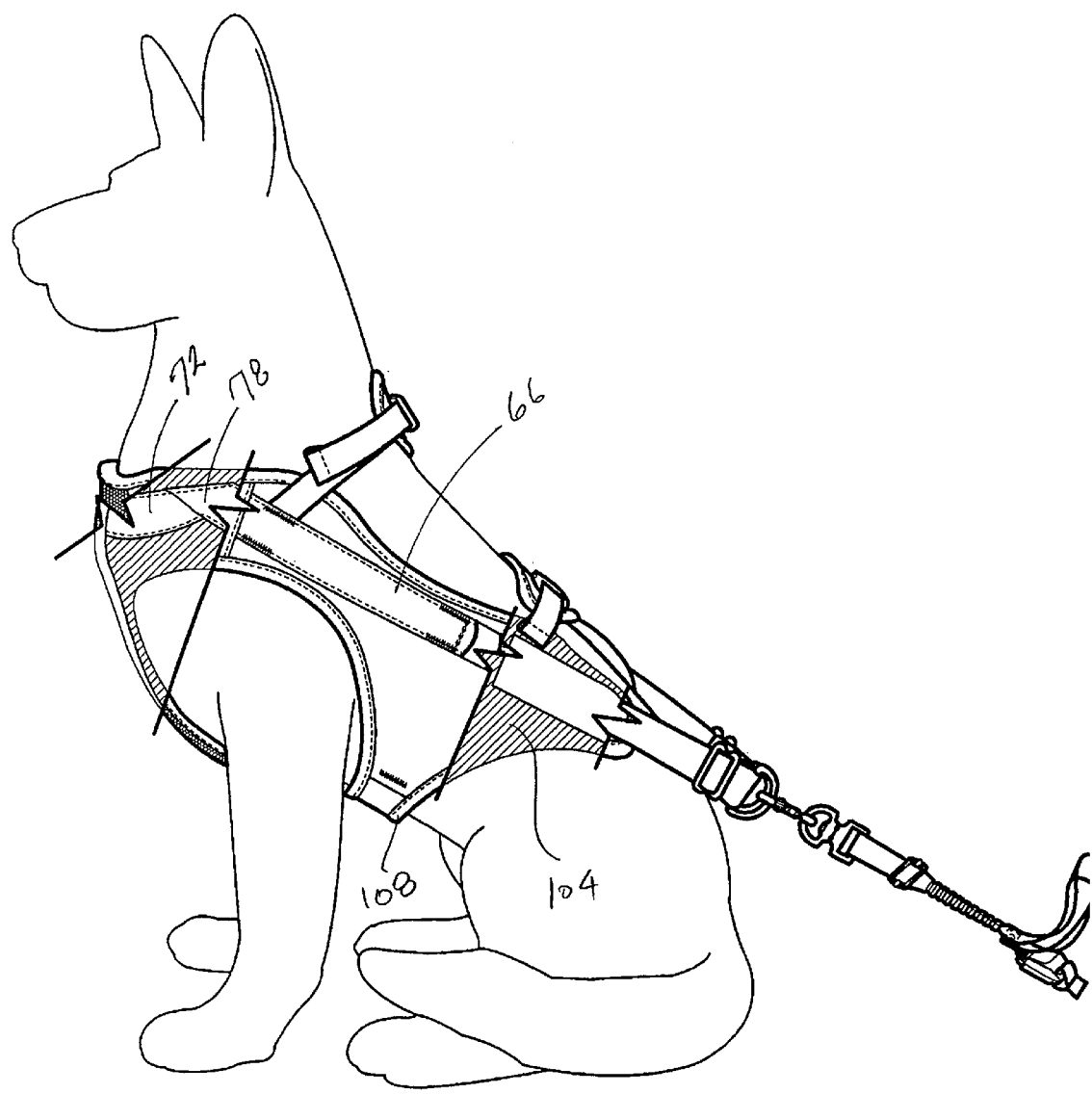
FIG. 9 is a left hand side elevation partially cut away depicting the embodiment of FIG. 8.
Figure 10:
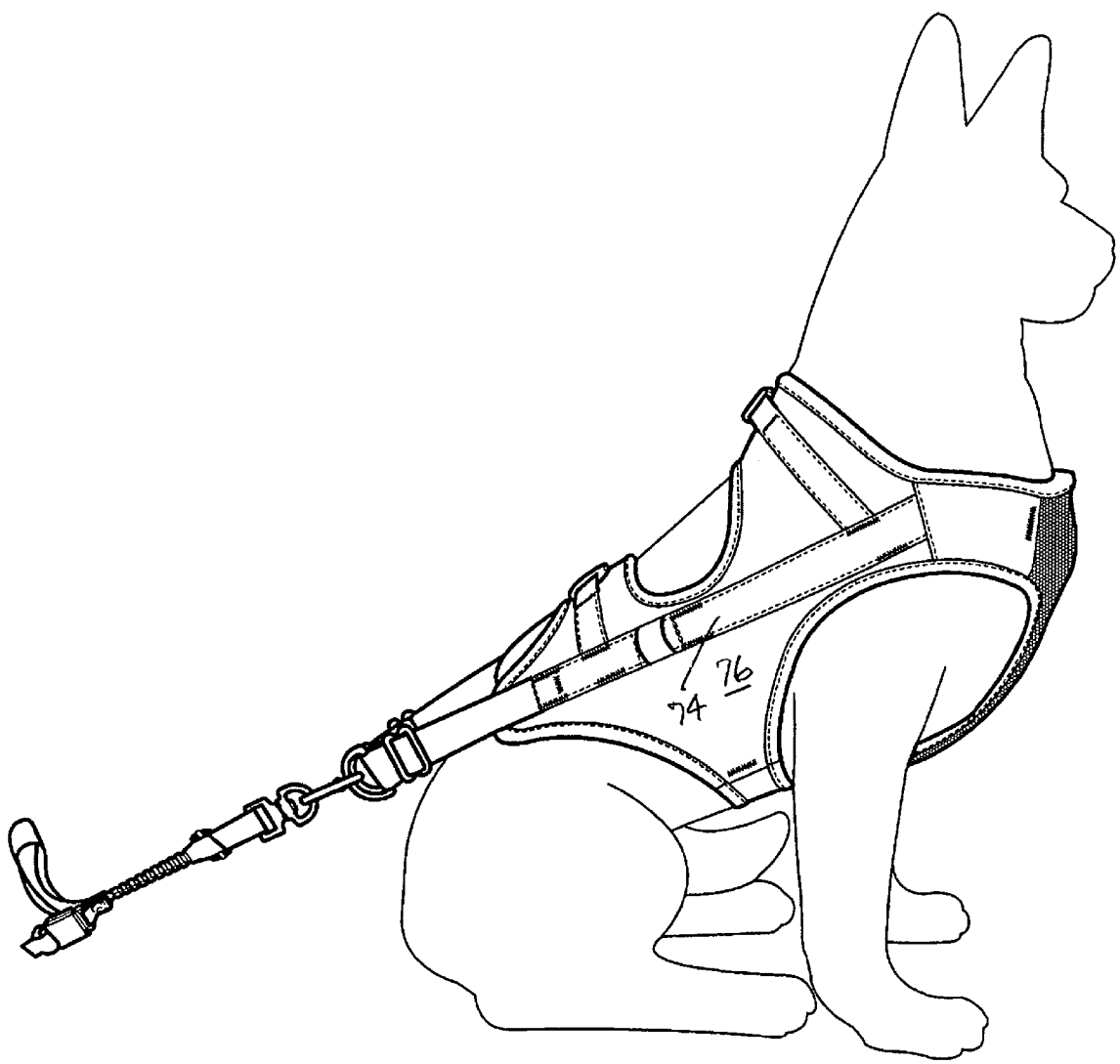
FIG. 10 is a right side elevation of the embodiment of FIG. 6.
Figure 11:
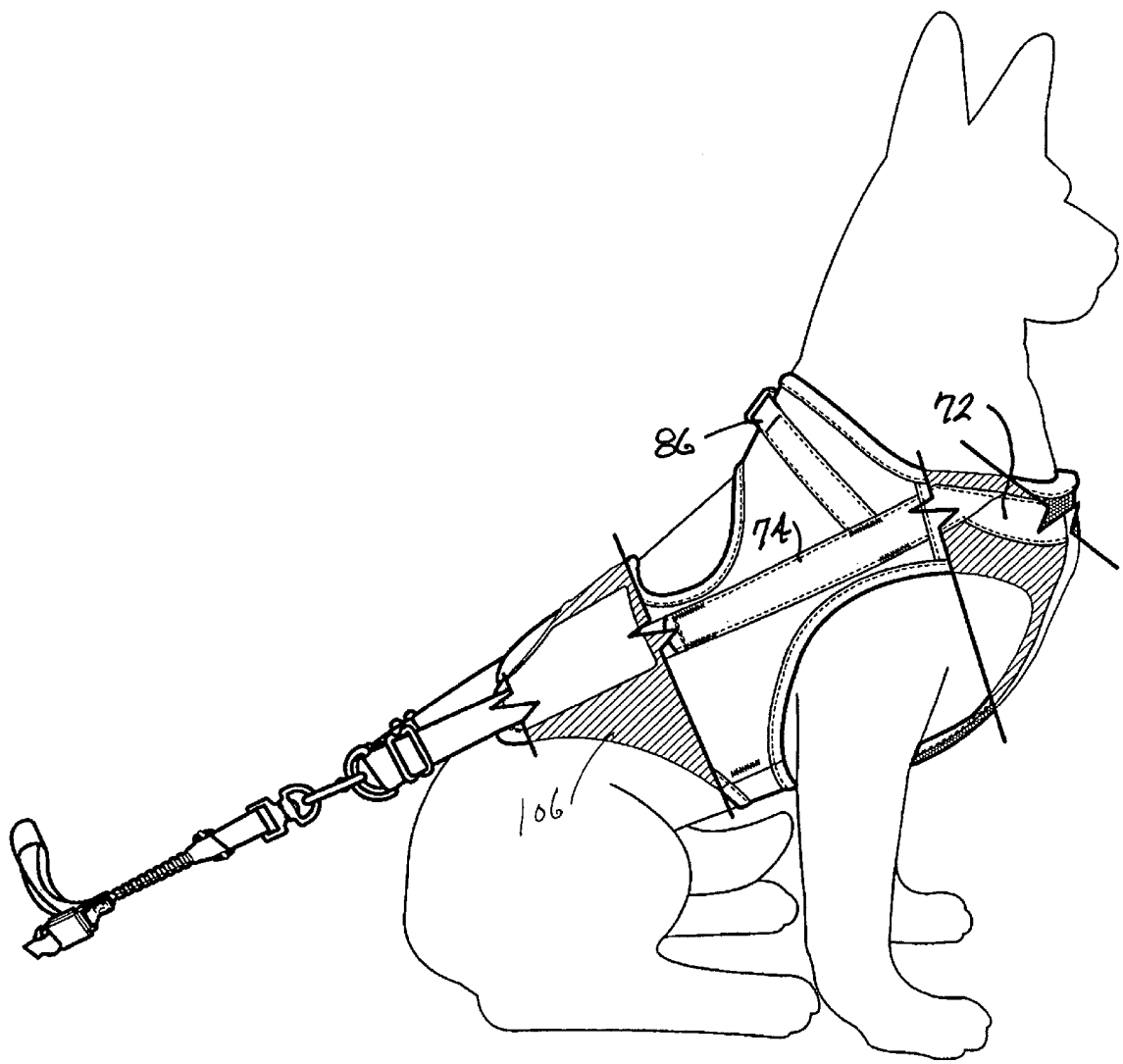
FIG. 11 is a partial cut away view of the right hand side elevation of FIG. 10.
Figure 12:
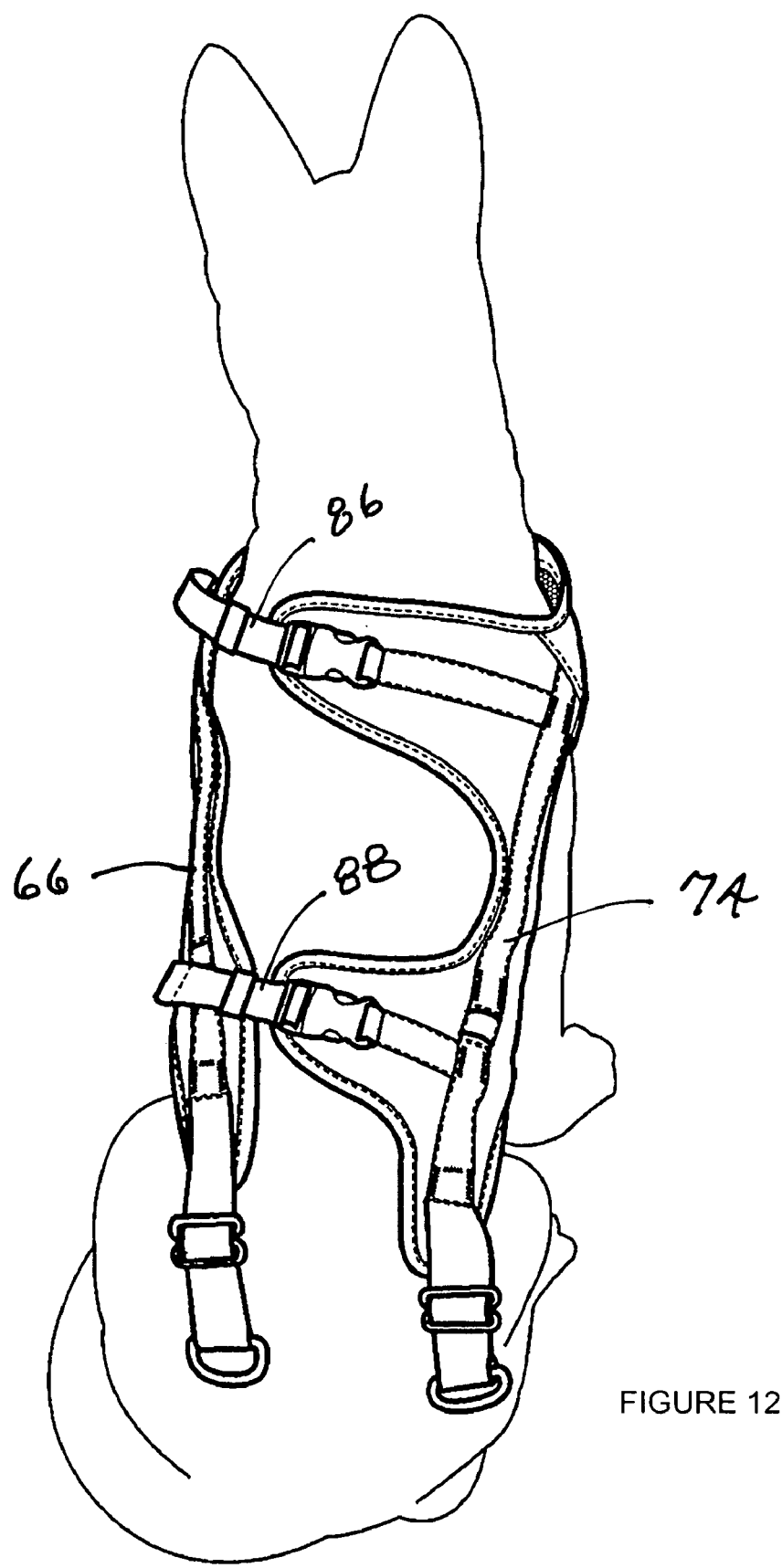
FIG. 12 is a back side elevation of the embodiment of FIG. 6.
Figure 13:
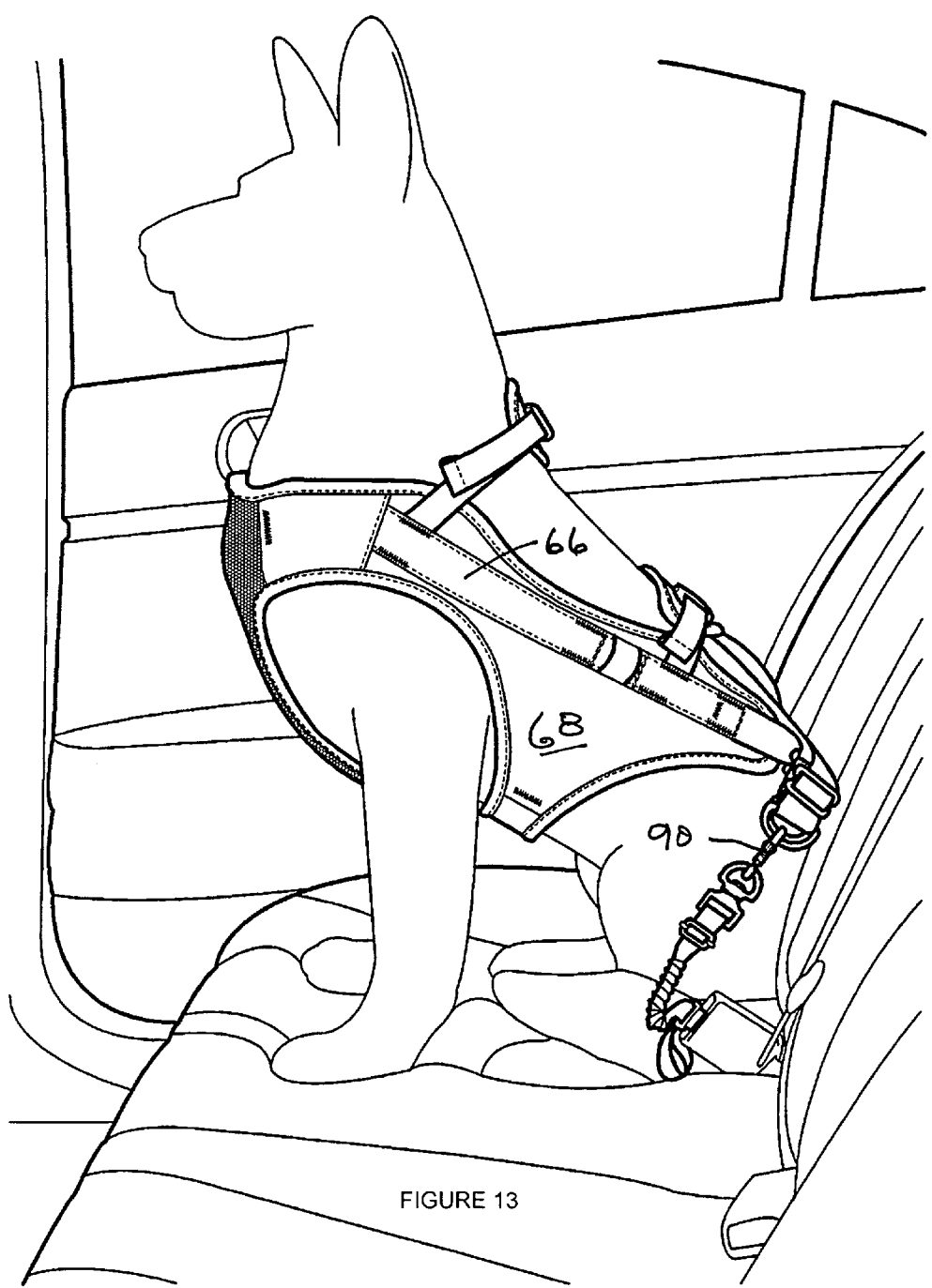
FIG. 13 is a left hand side elevation of the embodiment of FIG. 6 positioned on an animal retained within a motor vehicle seat.

A unitary chest and girth panel 60 includes a left hand leg opening 62 and a right hand leg opening 64. A left side longitudinal support strap 66 is affixed to the lateral left side panel section 68 of the unitary panel 60 and extends from a tail end 70 of the panel 60 forwardly above the leg opening 62 and over a leg of an animal, such as depicted in FIG. 8. The longitudinal strap 66 is further extended as a single strap element having a forward section 72, as illustrated in FIG. 7, which wraps around the forward side of the chest panel 60 and extends along the opposite side of the chest panel 60 where it comprises a right hand side strap 74 which is affixed to the right hand side section 76 of the panel 60. Thus, the strap 66 comprises, in the embodiment of FIGS. 6-15, a single elongate strap which is affixed to the panel 60 and extends along the lateral sides of the panel 60 as well as about the front side. The single strap 66 as depicted in FIG. 9 is folded upon itself at a fold 78 where it connects to the forward side 72.

This fold enables additional support to be provided for the forward side of the panel 60. By constructing the single strap or lateral side strap 66 and 74 in a folded over manner as depicted, the front portion 72 of that strap is aligned generally transversely to the chest of the animal, for example, as depicted in FIG. 7. This provides improved support for the animal harness and improved comfort and safety.

As an additional feature, a medial longitudinal strap 80 is affixed to the panel 60 and extends generally down the midline of the panel 60 from the top margin 82 of panel 60, toward the tail section of the harness. Additional reinforcing such as a semi-stiff reinforcing plastic or polypropylene board 84 may also be inserted in the chest panel section 82. This stiffening feature of the embodiment again enhances the comfort and the security of the described animal harness.

Figure 14:
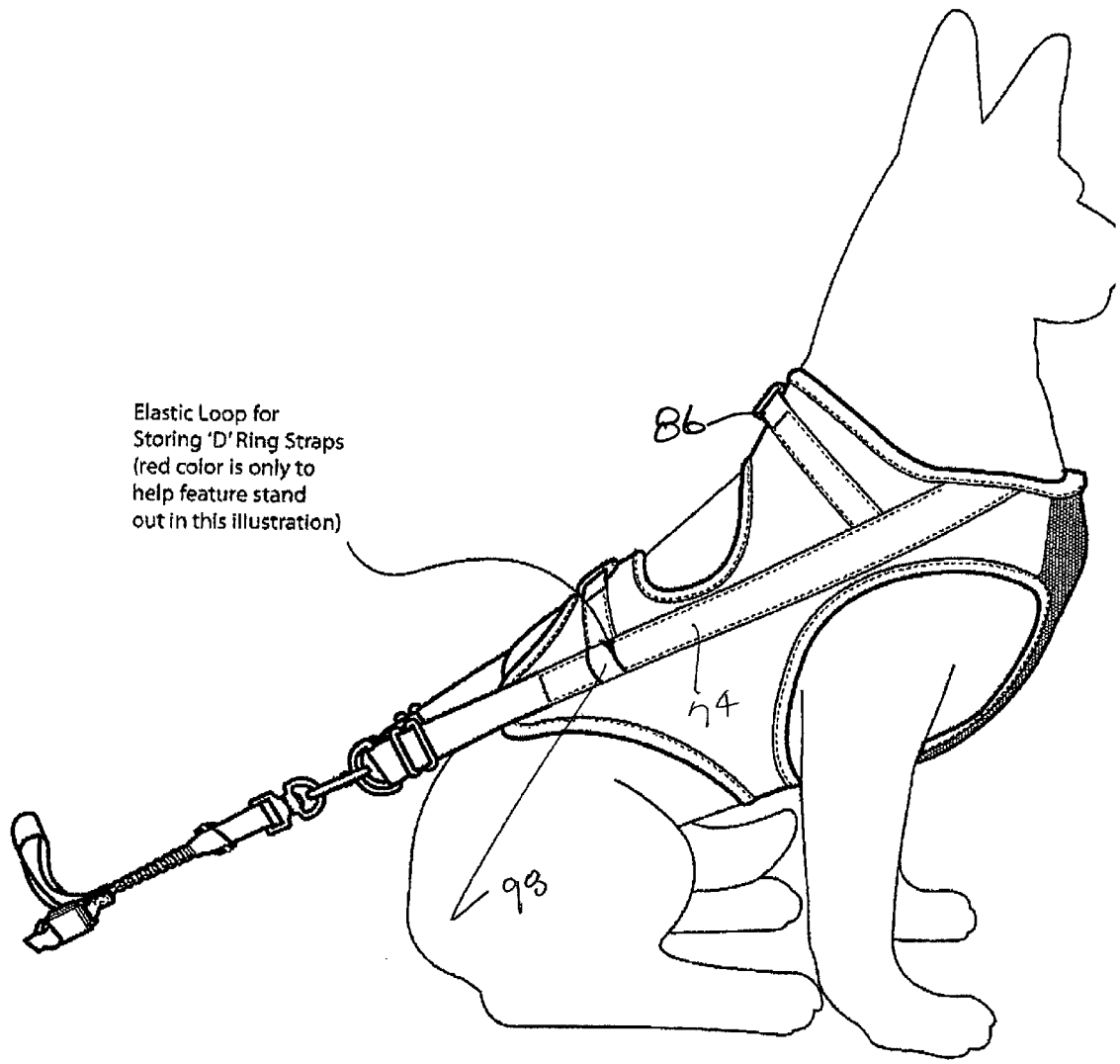
FIG. 14 is a right hand side elevation of the embodiment of FIG. 6 depicting the positioning of the animal harness on an animal and illustrating the feature of an arrangement for storing the retention straps of the animal harness.
Figure 15:
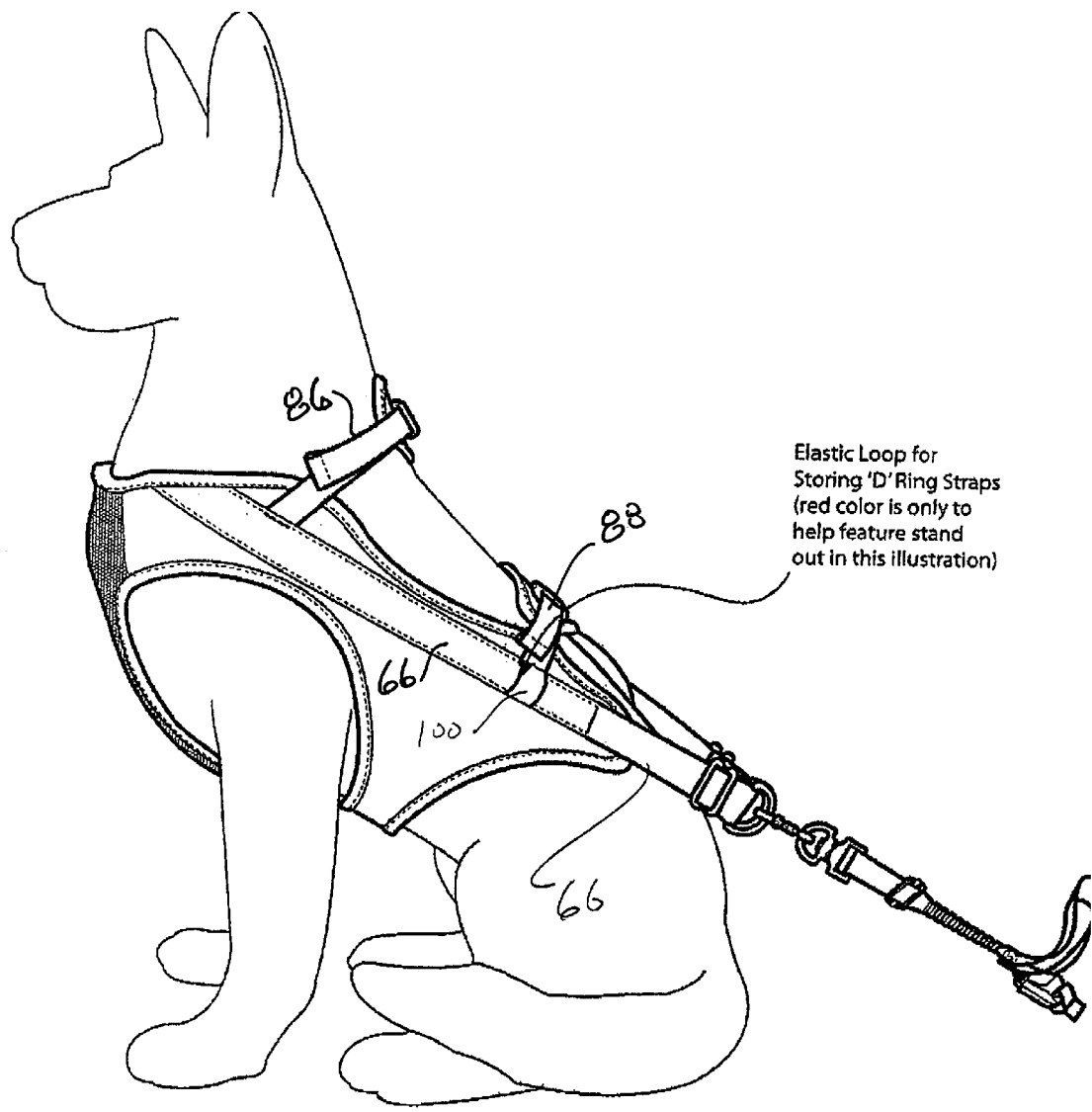
FIG. 15 is a left hand side elevation of the embodiment of FIG. 6 further illustrating the feature for storage of the straps when the animal is not positioned within a motor vehicle.

The embodiment of FIGS. 6-15 also includes the transverse crossing straps, such as straps 86 and 88 which connect the lateral sides of the panel 60. The lateral side straps 66 and 74 also are connected respectively to D-rings 67 and 75 which are, in turn, connected to a carbiner 90 associated with a retention strap 92 in the manner associated with the previously described embodiment. The straps 66 and 74 are adjustable in length to accommodate various sizes of animals. Additionally, the straps 66 and 74 may be independently disconnected from the carbiner 90 and retained by retention loops, such as elastic loop 98 for the right hand strap 74 and retention loop 100 for the left hand strap 66 as illustrated in FIGS. 14 and 15, respectively.

As a further feature of the embodiment of FIGS. 6-15, extension wings or stiffening sections 104 and 106 are included for the left hand and right hand sides respectively of the panel 60, particularly adjacent the tail end thereof. Thus, the panel 60 may be comprised of layers of fabric with a plastic or shaped polypropylene stiffening member inserted between the layers of fabric or flexible plastic material. In this manner, the component parts forming the panel 60 may be multi-layered and joined together by means of binding, for example, a binding strip 108 as depicted in FIG. 9.

The embodiments of FIGS. 1-5 and FIGS. 6-15 are designed to protect the animal with a harness arrangement that is easily placed on the animal and which includes features for placement of a protective panel against the chest, along the sides and under the girth of the animal and connected over the top side or back of the animal and which includes retention straps fixed along the sides and over the front or chest section of the protection panel. The size, arrangement and adjustability of the straps may be varied. The thickness and width of the straps may be varied. The particular construction of the panel which covers the chest, girth and fits over the back of the animal may be varied and may include multiple layers of fabric, padding, reinforcing material as well as stiffening material and may be sewn together to provide a unitary, yet comfortable harness for the animal.

While there has been set forth preferred embodiments of the invention, it is to be understood the invention is limited only by the following claims and equivalents thereof and that various combinations and permutations of the described features may be incorporated in alternative embodiments.

What is claimed is:

1. An animal harness comprising, in combination:
    a single, unitary girth and chest panel having a generally symmetrical configuration about a longitudinal axis and including a first right leg opening and a second left leg opening located respectively on opposite sides of the longitudinal axis, a head end, a tail end, a first longitudinal side, a second longitudinal side, said first and second longitudinal sides located respectively on opposite sides of the longitudinal axis for positioning along the sides of an animal, said girth and chest panel further including a girth section connecting the first and second opposite, longitudinal sides of the girth and chest panel, for positioning along the stomach of an animal, a right hand margin and a left hand margin along the first and second longitudinal sides, respectively, extending longitudinally generally from the head end to the tail end;
    a first connection strap generally releaseably connecting the first and second longitudinal sides of the girth and chest panel to provide a head opening;
    a strap assembly comprising first and second longitudinal straps attached to the girth and chest panel on the first and second sides of the girth and chest panel respectively and extending longitudinally from the right and left hand leg openings and along the right hand and left hand margins respectively to the tail end and outwardly from the tail end; and
    a connection element for releasable attachment of the first and second straps at the tail end to a position restraining element.

2. The harness of claim 1 wherein the connection element is at least partially elastic.

3. The harness of claim 1 wherein the releasable attachment connection element includes a buckle member.

4. The harness of claim 1 including a releasable buckle member connecting the connection element to the left and right longitudinal straps.

5. The harness of claim 1 including a second connection strap for connecting the first and second sides, said second connection strap positioned generally parallel to the first connection strap intermediate the first connection strap and the tail end of the girth and chest panel.

6. The harness of claim 5 wherein the second connection strap releaseably connects the first and second sides.

7. The harness of claim 1 wherein one of the first and second girth and chest panel sides includes a chest panel extension for fitting over at least a portion of the top, back side of an animal in the harness.

8. The harness of claim 1 wherein the strap assembly further comprises a front chest strap member attached to the girth and chest panel at the front end of the harness connecting said first and second longitudinal straps.

9. The harness of claim 1 wherein the girth and chest panel further includes a medial reinforcing member extending generally longitudinally from the front end toward the tail end of the girth and chest panel.

10. The harness of claim 1 further including a reinforcing stiffening panel incorporated in the girth and chest panel.

11. The harness of claim 10 wherein the reinforcing stiffening element is positioned in the tail end of the girth and chest panel.

12. The harness of claim 10 wherein the reinforcing stiffening element is positioned in the front end of the chest panel.

* * * * *